United States Patent

[11] 3,610,934

| [72] | Inventor | Wheeler M. Turner<br>Montecito, Calif. |
|---|---|---|
| [21] | Appl. No. | 852,244 |
| [22] | Filed | Aug. 22, 1969 |
| [45] | Patented | Oct. 5, 1971 |
| [73] | Assignee | Century Geophysical Corporation<br>Los Angeles, Calif. |

[54] AUTOMATIC FOCUSING SYSTEM UTILIZING MEANS FOR ALTERNATELY DIRECTING LIGHT OVER TWO PATHS HAVING SLIGHTLY DIFFERENT LENGTHS
7 Claims, 6 Drawing Figs.

[52] U.S. Cl. .................................................. 250/201,
95/45, 250/204, 250/235
[51] Int. Cl. ....................................................... G03b 3/00,
H01j 3/14, H01j 5/16
[50] Field of Search ........................................... 95/45;
250/201, 204, 234, 235

[56] References Cited
UNITED STATES PATENTS
| 2,831,057 | 4/1958 | Orthuber ..................... | 250/201 X |
| 2,838,600 | 6/1958 | Salinger ...................... | 250/201 X |

*Primary Examiner*—James W. Lawrence
*Assistant Examiner*—T. N. Grigsby
*Attorney*—Christie, Parker & Hale ABSTRACT: Apparatus for sensing changes in the high-frequency content of a video signal with changes in sharpness of focus of an optical system where the video signal is generated by transducer means scanning an area of the image produced by the optical system. A null-balance servo is used to adjust the focus, the control signal for the servo being derived by summing two such video signals generated by effectively scanning the image slightly in front of and behind the focal plane of the optical system.

INVENTOR.
WHEELER M. TURNER
BY
Christie Parker & Hale
ATTORNEYS

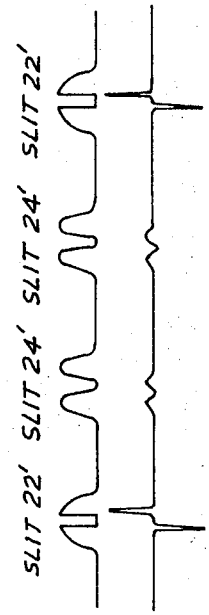
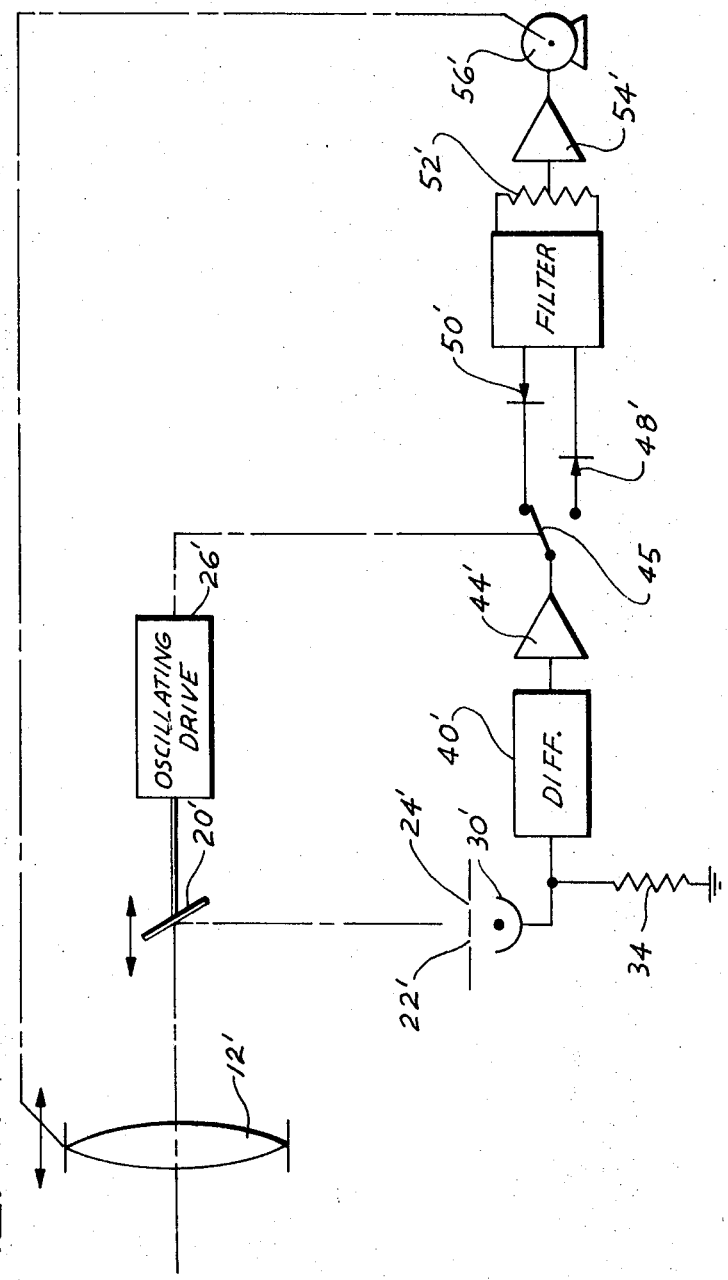
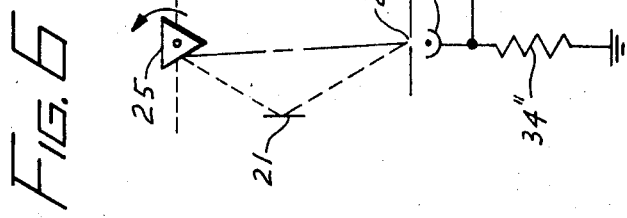
FIG. 5
FIG. 4
FIG. 6

3,610,934

AUTOMATIC FOCUSING SYSTEM UTILIZING MEANS FOR ALTERNATELY DIRECTING LIGHT OVER TWO PATHS HAVING SLIGHTLY DIFFERENT LENGTHS

FIELD OF THE INVENTION

This invention relates to optical systems with automatic focusing means, and more particularly, is concerned with a method and apparatus for achieving focus of an optical system by measuring changes in the sharpness of the image as the optical system brings the image in and out of focus at the focal plane.

DESCRIPTION OF THE PRIOR ART

It is well known to achieve focusing of an optical system by visually observing the image and adjusting the position of the optical system relative to the focal plane until maximum sharpness of the image is achieved. Many times, however, it is not practical to directly observe the image at the focal plane of the optical system. Sometimes separate optical systems are used, such as in the double lens reflex cameras or the like, or a mirror or other optical system may be introduced temporarily in front of the focal plane to direct the image onto a separate ground glass screen, as in the single-lens reflex-type camera. More commonly, however, the adjustment of the lens position is directly calibrated in terms of distance between the optical system and the object on which the system is being focused. The focus is then set by either directly measuring the distance to the object or utilizing some type of range finder device for optically measuring the distance to the object.

None of these known arrangements lend themselves effectively to an automatic focusing system capable of achieving and maintaining accurate focus of an optical device. The direct focusing of the image on a ground glass screen, for example, is essentially a trial and error process which cannot be readily automated. Furthermore, except in the case of dual lens systems which can be quite costly, such arrangements for directly viewing the image interfere with other uses of the image, such as exposing photographic film. This is particularly troublesome where it is desired to adjust the focus continuously so as to track a moving object, for example. The range finder type of focal system has the disadvantage that it is rather limited in range, not being particularly effective for sensing small changes in distance of an object that is either at very close range, as in a microscopic lens system, or at very long range, as in a telescopic lens system.

BRIEF DESCRIPTION OF THE INVENTION

The present invention provides an improved automatic-focusing method and system for adjusting the focal position of an optical lens device to maintain proper focus of an image at the focal plane of the device. This is accomplished, in brief, by scanning a very small area of the image formed by the optical device with a light-sensitive transducer means to generate a signal that varies with light intensity over the area scanned. The area scanned is selected to include the desired region of the object or objects being brought into focus. A second transducer means, or the same transducer means on a time-shared basis, scans the same area but at a slightly different distance from the optical lens device. A null-balance servosystem adjusts the position of the lens device relative to the two scanning transducers until the magnitude of the high-frequency components of signals from the two transducers are made equal in amplitude, at which time the system is in proper focus.

BRIEF DESCRIPTION OF THE DRAWINGS

For a better understanding of the invention, reference should be made to the accompanying drawings, wherein:

FIGS. 2, 3, and 5 show a series of waveforms useful in explaining the operation of the invention; and FIGS. 4 and 6 are schematic showings of alternative embodiments.

DETAILED DESCRIPTION

Figure 1:
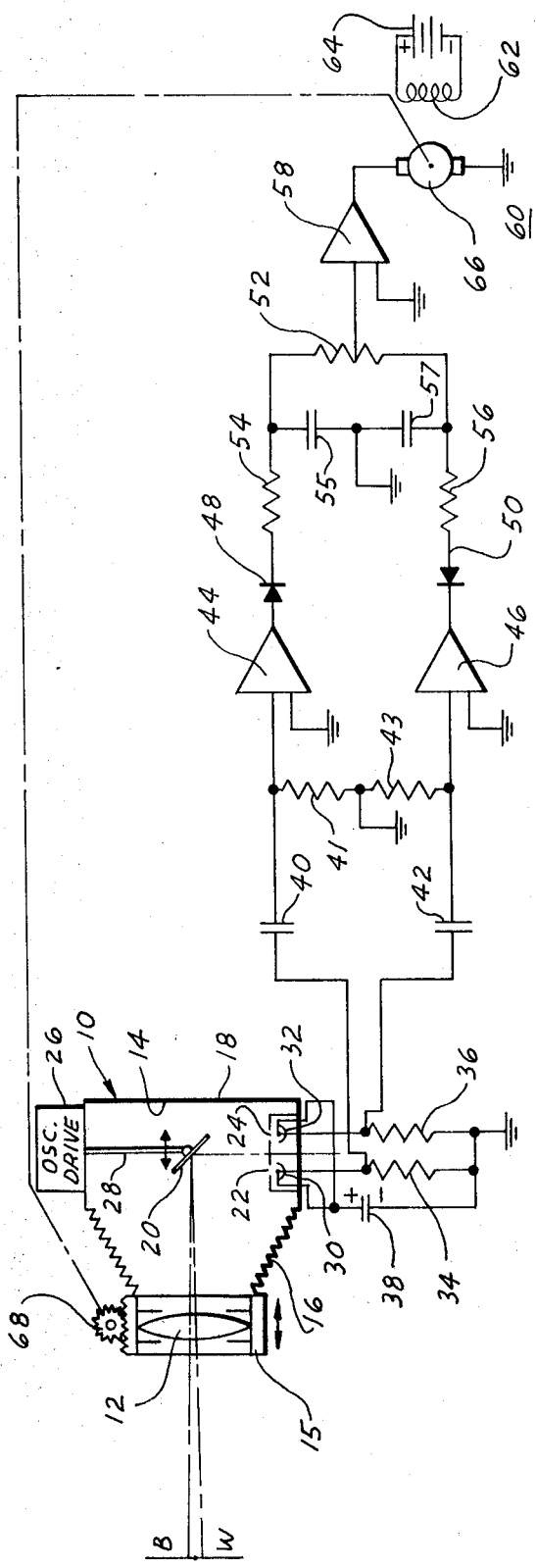
FIG. 1 is a schematic showing of one embodiment of the present invention.

Referring to FIG. 1 in detail, there is shown one embodiment of an optical device such as a camera, indicated generally at 10, of a type having a lens 12 for focusing light from an object onto a light-receiving plane or surface 14. The lens 12 is movable toward and away from the plane 14 so as to achieve focus of the image at the plane 14. For this purpose, the lens 12 is shown mounted in a tubular mounting 15 which, in turn, is mounted for movement in a direction parallel to the axis of the lens. A bellows 16 may join the lens mounting 15 to a case 18 to provide a light-impervious enclosure, in conventional manner.

Automatic focusing is achieved by scanning a small portion of the image formed by the lens 12. This is accomplished by mounting a very tiny mirror 20 along the optical axis of the lens 12 which intercepts a small portion of the light passed by the lens and reflects it downwardly toward a pair of small apertures 22 and 24 in an enclosure mounted inside of the case 18. As hereinafter explained in detail, the apertures are normally positioned substantially at the image plane of the lens 12 and mirror 20, the aperture 22 being normally slightly in front of the image plane and the aperture 24 being slightly behind the image plane because of the difference in path length of light reaching the two apertures from the lens via the mirror. The mirror 20 is caused to oscillate back and forth along the optical axis of the lens 12 by an oscillating drive 26 connected to the mirror 20 by means of a shaft 28. The shaft 28 passes through the side of the camera case 18 from oscillating drive 26.

As the light reflected by the mirror 20 is swept alternately past the slits 22 and 24 by movement of the mirror, it falls on a pair of phototubes 30 and 32. The phototubes respectively produce a pair of voltage signals across resistors 34 and 36. A battery 38 provides suitable bias voltage for the phototubes. These two signals are respectively coupled through a pair of high-pass filters shown as R-C differentiating networks 40, 41, and 42, 43. The high-frequency components passed by these filters are amplified, respectively, by amplifiers 44 and 46. The outputs of the amplifiers are then rectified by diodes 48 and 50 and connected across opposite ends of a common load resistor 52 through suitable low-pass filters, indicated by the R-C circuits 54, 55, and 56, 57. Diodes 48 and 50 are connected with opposite polarity so that the center point of the output resistor 52 varies about zero depending upon the difference in amplitude of the input signals derived from the resistors 34 and 36.

The center point of the resistor 52 is applied through a direct coupled amplifier 58 to a DC servomotor indicated generally at 60. Servomotor 58 may, for example, include a separately excited field 62 energized from a suitable DC source such as a battery 64, with an armature 66 connected across the output of the amplifier 58. The armature shaft of the servomotor is connected to a rack and pinion drive 68 or other suitable drive means for imparting movement to the lens 12 in response to the rotation of the servomotor 60.

To understand the operation of the automatic focusing system, assume the camera is directed at an object so that the optical axis is pointed toward a region of transition between a relatively light area and a relatively dark area of the object, for example, the edge of a building or the like. This line between the light and dark areas falls on the mirror 20 and is reflected toward the slits 22 and 24. As the mirror oscillates back and forth along the optical axis, the line formed by the transition between the light and dark areas sweeps successively across the two slits causing an abrupt change in the light flux striking the respective phototubes 30 and 32. It should be noted that the light path from the lens to the slit 22 is somewhat shorter than the light path from the lens to the slit 24 because the mirror 20 moves closer to the lens 12 at the time it is reflecting the transition line of the object onto the slit 22. Assume for the moment that the distance from the lens 12 to the slit 24 is the proper distance to focus the image of the object sharply on the slit 24, then the same image, when the mirror 20 reflects it on the slit 22, is slightly out of focus because of the shorter distance between the mirror 20 and the lens 12.

Figure 2:
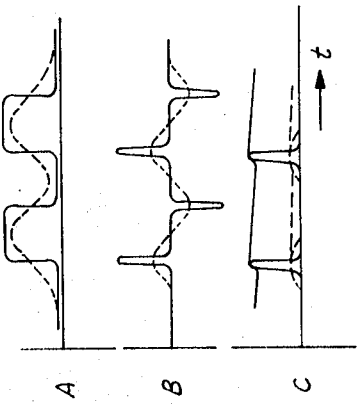

As the oscillating drive 26 moves the mirror, the transition between the light area and the dark area of the image sweeps across the slit 24. The resulting output waveform produced across the resistor 36 is shown by the solid dark line in FIG. 2A. As the slit is exposed first to the dark area and then to the light area of the image, the voltage steps abruptly from substantially zero to a high level. As the mirror 20 retraces its path, the process is reversed and the voltage steps back down to substantially zero. Thus, as the mirror sweeps back and forth relative to the slit 24, a voltage of substantially square waveform is produced across the associated resistor 36.

However, at the slit 22, because the image is slightly out of focus, the line between the light and dark areas is more diffused by the out-of-focus condition. Therefore as the image is scanned by the mirror 20 across the slit 22, there is a much more gradual transition from the dark area to the light area and from the light area back to the dark area. As a result, the voltage across the resistor 34 changes more gradually, as shown by the dashed line waveform of FIG. 2A.

After differentiation and amplification, the square waveform of FIG. 2A produces a series of alternate polarity voltage spikes in response to the voltage across resistor 36. The differentiation of the gradually varying signal produced across the resistor 34 results in much smaller and more spread out pulses after differentiation and amplification than are produced by the focused image, as shown by the dashed waveform of FIG. 2B.

After rectification and filtering of the respective signals, a substantially DC voltage is produced which is of much larger magnitude for the high-amplitude spikes and of much lower magnitude for the low-amplitude pulses derived from the respective voltage signals across the resistors 36 and 34. This is shown by the solid line and the dashed line of FIG. 2C. Because of the diodes 48 and 50, the respective output voltages of course area of opposite polarity. These voltages are "summed" across the resistor 52, producing a DC output signal at the center top of the resistor 52 which is proportional to the difference in magnitude of the two voltages. If the two voltages are equal, the difference of course is zero.

Figure 3:
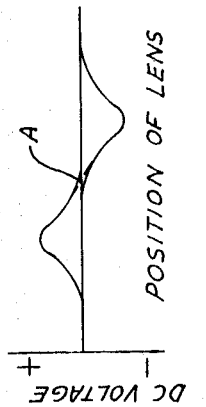

It will be seen that if the lens 12 is moved to the left as shown in FIG. 1, a condition will be approached where the slit 22 comes into focus and the slit 24 goes out of focus. As a result, the DC signal derived by differentiation, amplification, and filtering of the output of the voltage across the resistor 34 will increase in magnitude while the voltage output derived from the signal across the resistor 36 will decrease in magnitude. Thus, a null condition is approached at the center point of the resistor 52 where the correct focal distance for the focusing of the image falls halfway between the two slits. This is shown by the waveform of FIG. 3 which shows the output voltage from the filter 54 and the output voltage derived from the filter 56 as a function of the position of the lens. It will be seen that the sum of these two signals passes through a zero null point at A. Thus, a null-balance servo is provided in which the servomotor 60 attempts to move the lens into a position at which the output of the amplifier 58 goes to zero.

From the above description, it will be recognized that a method and apparatus are provided for utilizing changes in the high-frequency content of a video signal derived by the scanning of a part of the image in which a sharp transition takes place between a light and dark area to sense the out-of-focus condition of an optical system. By using two video detectors, a null-balance servosystem is provided for adjusting the focusing of the optical system to bring it into proper focus. While separate phototubes have been shown for producing two video signals, it is preferable to use a single phototube on a time-sharing basis by alternately directing the light along two paths of different length from the lens system to the slit. Such an arrangement is shown schematically in FIG. 4 wherein a single phototube 30' is provided behind the two slits 22' and 24'. The video signal generated by the phototube 30' is coupled to an associated differentiating circuit 40' and amplifier 44'. The output of the amplifier 44' is timed-shared between two rectifiers by a commutating switch 45 which is actuated in synchronism with the oscillating mirror 20' by the mechanical oscillating drive 26'. While a mechanical switch is shown by way of example, transistor switching may be preferred for higher scanning rates.

The input to and output from the differentiating circuit 40' are shown in FIG. 5 for the condition where the object is a line on a contrasting background, rather than simply a transition between a light and dark area, as described above in connection with FIG. 2. The waveform depicts a condition where the object is more in focus at slit 22' than slit 24'.

It is also possible to utilize a single slit rather than two slits, as shown in FIG. 6. Two paths of different length are provided by a second mirror 21. Also, instead of an oscillating mirror, a continuously rotating multisided mirror 25 may be used. Each facet of the mirror 25 successively sweeps the image across the slit twice, first directly and then by reflection off the mirror 21.

It should be further noted that the arrangements described are shown as a single-lens type of camera. It will be appreciated that any interference of the picture at the image plane by the mirror, oscillating drive, and phototube pickup can be avoided by a double-lens camera where the automatic-focusing device would be mounted behind the viewing lens so as not to interfere with the picture lens. Alternatively the automatic-focusing apparatus may be arranged to move out of the way of the picture field in a single-lens camera or may be mounted entirely to one side and a partial mirror interposed to split the light from the lens partially to one side to the automatic-focusing device. While the invention is described as applied to automatic focusing, it will be appreciated that by addition of a calibrated scale, the system can be used as an automatic range-measuring device.

I claim:

1. Apparatus for automatically focusing an optical system capable of forming an image in an image plane, comprising light-sensing means, means directing a small portion of the image-forming light passing through the optical system toward the light-sensing means, said light-directing means including means for alternately directing said portion of the light over two paths of slightly different lengths to the light-sensing means, means for periodically shifting said small portion of the image-forming light relative to the light-sensing means for sensing variations of light intensity within said small portion of light, means including high-pass filter means for generating first and second control signals in response respectively to the light directed at the sensing means over said first and second paths, and servo means responsive to the difference in amplitude of the first and second signals for adjusting the focus of the optical system to vary simultaneously the lengths of said two light paths.

2. Apparatus as defined in claim 1 wherein the light-sensing means includes two separate light-sensitive elements positioned at different optical distances relative to the optical system and light-directing means to provide said two paths of different length.

3. Apparatus as defined in claim 1 wherein the light-sensing means includes a single light-sensitive element and switching means for switching the output from the element to two separate signal channels in synchronism with said means for periodically changing the path length of the light.

4. Apparatus as defined in claim 1 wherein said optical system includes a lens and said light-directing means includes a mirror positioned behind the lens for directing a portion of the image-forming light from the lens to the light-sensing means, and means for oscillating the mirror in a direction toward and away from the lens.

5. Apparatus as defined in claim 1 wherein the light-sensing means has a pair of spaced apertures, the two paths of light extending respectively to the two apertures.

6. Apparatus as defined in claim 1 wherein said light-directing means includes a rotating reflecting element and a stationary reflecting element, the rotating element being positioned behind the lens and reflecting the light alternately along a direct path to the light-sensing means and along a longer path including the stationary reflecting element.

7. In an optical system having a movable lens element for focusing an image at an image plane, automatic-focusing means comprising a light-sensing element having a pair of apertures, a mirror positioned between the lens and the image plane for intercepting a small portion of the light directed by the lens toward the image plane and diverting the light to the light-sensing element, means moving the mirror to scan the reflected light across the two apertures in succession, means for providing first and second output signals that vary in response to the changes in the light intensity falling on the respective apertures, and servo means responsive to the two signals for moving said lens element to equalize the two signals.